(12) United States Patent
Yano et al.

(10) Patent No.: US 6,213,257 B1
(45) Date of Patent: Apr. 10, 2001

(54) SQUEAK PREVENTING SHIM

(75) Inventors: Kunihiko Yano, Saitama; Takahiro Niwa, Kanagawa; Masaki Yoshihara, Nara, all of (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/189,169

(22) Filed: Nov. 9, 1998

(30) Foreign Application Priority Data

Nov. 13, 1997 (JP) .................................................. 9-329462

(51) Int. Cl.$^7$ ...................................................... F16D 65/38
(52) U.S. Cl. .................................... 188/73.37; 188/250 E
(58) Field of Search ............................ 188/73.37, 250 E, 188/264 G, 256; 192/30 V; 52/204.1 T; 49/475.1 T; 296/93; 428/595

(56) References Cited

U.S. PATENT DOCUMENTS 5,083,643 * 1/1992 Hummel et al. ................. 188/251 A
5,515,950 * 5/1996 Kwolek ............................... 188/73.36
5,762,166 * 6/1998 Yano et al. ........................ 188/73.37

* cited by examiner

Primary Examiner—Robert J. Oberleitner
Assistant Examiner—Xuan Lan Nguyen
(74) Attorney, Agent, or Firm—Flyyn, Thiel, Boutell & Tanis, P.C.

(57) ABSTRACT

A squeak preventing shim for a disk brake for an automobile has a squeak preventing effect, even if no lubricant is used, and also prevents decreased durability due to buckling, flow, etc. A shim construction is formed with a plurality of grooves or recesses in rubber layers 2 disposed on two surfaces of a metal plate in a rubber coated member. Owing to these grooves or recesses, apparent transversal elastic modulus of the rubber layers is lowered and a squeak preventing effect due to vibration in a parallel direction to the shim can be obtained, even if no lubricant is used. Further, since longitudinal elastic modulus does not vary much, the shim construction is durable.

16 Claims, 3 Drawing Sheets

SQUEAK PREVENTING SHIM

FIELD OF THE INVENTION

The present invention relates to a squeak preventing shim for a disk brake of an automobile and in particular to an improvement of a vibration damping shim construction for reducing high frequency noise (squeaking phenomena) produced at braking.

DESCRIPTION OF THE PRIOR ART

Heretofore, as a squeak preventing shim for a disk brake of an automobile there is known a shim using a shim construction A, in which a rubber coat metal (RCM) consisting of a thin metal plate 1 such as a steel plate (cold pressed plate), a stainless steel plate, a copper plate, etc., on both the sides of which thin rubber layers 2 are disposed by rubber coating, is used as a raw material and lubricant 7 is applied on a backplate 4 of a disk brake pad consisting of the backplate 4 and a friction member 5, as indicated in FIG. 7 or a shim having a capacity of maintaining lubricant 7 increased by disposing a slit 9 through the entirety of the RCM and by superposing a metal (SUS) plate 10 on a back surface thereof, as indicated in FIG. 8.

Further there is known another shim, in which the shim construction A is formed by disposing an adhesive layer 3 on the surface of one of the rubber layers of the RCM and a restricted type vibration preventing construction consisting of RCM-adhesive layer 3-backplate 4 is produced by sticking the shim construction A to the backplate 4 of the disk pad consisting of the backplate 4 and the friction member 5 at the surface of the adhesive layer 3, as indicated in FIG. 9, a shearing deformation being produced thereby between the backplate 4 and the RCM, a vibration damping effect (squeak preventing effect) being obtained owing to this shearing deformation. Reference numeral 6 represents a brake piston member.

High frequency squeak of the disk brake may be caused by vibration in a parallel direction with respect to the shim. If the coating rubber has a high transversal elastic modulus, the vibration damping capacity is lowered so that the squeak preventing effect is hardly obtained. On the contrary, in a shim, in which the rubber has a low rigidity so that the transversal elastic modulus is low, a longitudinal elastic modulus is also lowered together therewith. Therefore it cannot bear a piston pressure of a caliper brake and so-called buckling, flow or peeling of the rubber layer is easily produced on the surface thereof so that the squeak preventing effect cannot be maintained a long time.

From such a point of view, in the construction indicated in FIG. 7 consisting of an RCM and lubricant, since lubricant applied thereon is not maintained, no lubricating effect is maintained a long time and buckling, flow or peeling of the rubber layer is easily produced on the surface.

On the other hand, in the construction indicated in FIG. 8, lubricant gathers around the slit so that it is hardly dispersed uniformly between the shim and the backplate. In addition, since there is a slit, which decreases contact surface of the RCM with the backplate, the effect of the rubber layer to dampen vibration can hardly be exhibited satisfactorily.

Further, in the construction indicated in FIG. 9, deterioration preventing agents or agents for preventing worsening due to ozone contained in the interior of the rubber layer 2 are separated to move towards the surface of the rubber layer (called blooming phenomena) due to heat produced by friction and thrusting force exerted by a piston member. In this way a layer of separated matter is formed at the interface between the rubber layer 2 and the adhesive layer 3. Since the deterioration preventing agents and the agents (wax component) for preventing worsening due to ozone, which have moved to the interface between the rubber layer and the adhesive layer in this way, melt at temperatures of 60° C. to 75° C., peeling is produced between the RCM and the adhesive layer. In this state, since the adhesive layer is not restricted between the backplate and the RCM, no shearing deformation is produced so that the vibration preventing effect (squeak preventing effect) decreases.

SUMMARY OF THE INVENTION

An object of the present invention is to eliminate the drawbacks of a prior art squeak preventing shim consisting of a shim construction using a rubber coat metal and a layer of lubricant or adhesive.

In order to achieve the above object a squeak preventing shim according to a first invention is characterized in that it has a shim construction consisting of a metal plate and a rubber layer disposed on at least one surface of the metal plate and that there are formed a plurality of grooves or recesses in the rubber layer.

A squeak preventing shim according to a second invention is characterized in that it has a shim construction consisting of a metal plate and rubber layers disposed on both the surfaces of the metal plate and that there are formed a plurality of grooves or recesses in one or both of the rubber layers.

A squeak preventing shim according to a third invention is characterized in that, in the second invention, there exists lubricant between one of the rubber layers in the shim construction and a backplate of a brake pad.

A squeak preventing shim according to a fourth invention is characterized in that, in the second or third invention, a metal plate is placed on a back surface of one of the rubber layers in the shim construction and that there exists lubricant between the metal plate and the rubber layer.

A squeak preventing shim according to a fifth invention is characterized in that it has a shim construction consisting of a metal plate, a rubber layer disposed on only one surface of the metal plate and an adhesive layer disposed on the other surface of the metal plate, where there is no rubber layer, the adhesive layer serving as a sticking portion to a brake pad, and that there are formed a plurality of grooves or recesses in the rubber layer.

A squeak preventing shim according to a sixth invention is characterized in that it has a shim construction consisting of a metal plate, rubber layers disposed on both the surfaces of the metal plate and an adhesive layer disposed on a surface of one of the rubber layers, the adhesive layer serving as a sticking portion to a brake pad, and that there are formed a plurality of grooves or recesses in the rubber layers.

DESCRIPTION OF THE PREFERRED EMBODIMENTS

Figure 1:
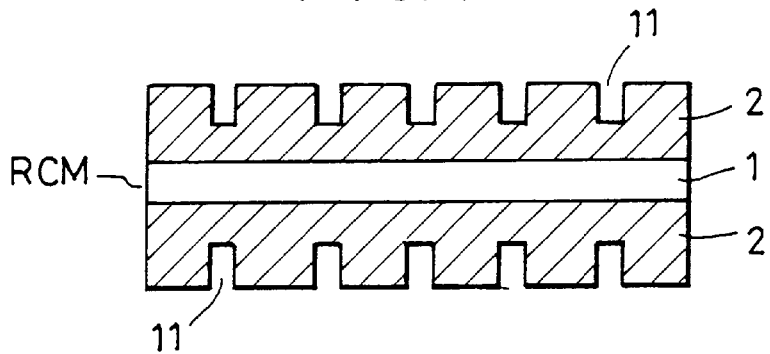
FIG. 1 is a cross-sectional view of a squeak preventing shim for a disk brake showing an embodiment of the present invention.

In a mode of realization of the first invention, a shim construction is formed by using a rubber coated metal consisting of a metal plate 1, on one or two surfaces of which one or two rubber layers are disposed, and by forming a plurality of grooves 11 or recesses 12 in one or both of the rubber layers. No lubricant may be used.

Hereinbelow several embodiments of the present invention will be explained, referring to the drawings.

Figure 6:
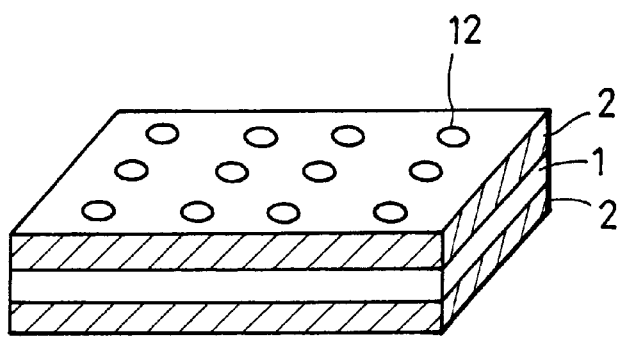
FIG. 6 is a perspective view showing another embodiment of the present invention.
Figure 7:
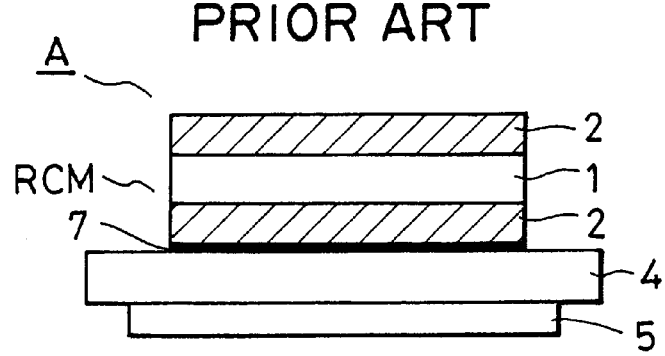
FIG. 7 is a cross-sectional view showing an example of prior art squeak preventing shims.
Figure 8:
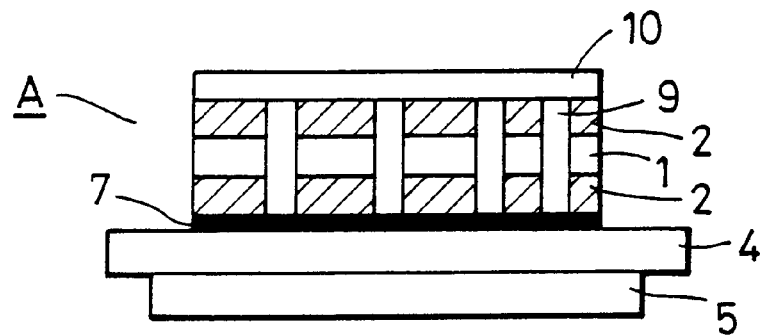
FIG. 8 is a cross-sectional view showing another example of prior art squeak preventing shims.

FIG. 1 shows an embodiment of the shim construction according to the present invention. In the shim construction using a rubber coat metal, in which two surfaces of a metal plate 1 are coated with rubber layers 2, a plurality of grooves 11 are formed in both (or one) of the rubber layers 2. Instead of the grooves 11, e.g. a plurality of semispherical recesses 12 may be formed, as indicated in FIG. 6.

Figure 2:
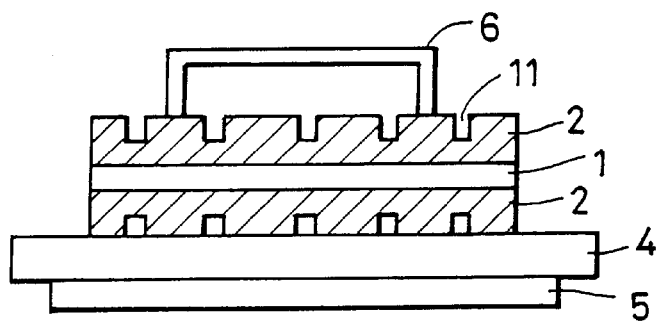
FIG. 2 is a cross-sectional view of a state, in which a shim construction indicated in FIG. 1 is mounted on a disk brake pad.

FIG. 2 shows a state, in which the shim construction is mounted on a backplate 4 of a disk pad.

Since there are formed the grooves or recesses in the squeak preventing shim according to the present invention, in a disk brake using it, apparent transversal elastic modulus of the rubber layers decreases and therefore it is possible to achieve the squeak preventing effect with respect to squeak due to vibration in a parallel direction to the shim, even if no lubricant is used. Further, since longitudinal elastic modulus of the rubber layers varies only slightly, it is possible to prevent also lowering of durability such as buckling, flow, etc. As an example, a ratio of the elastic moduli (transversal/longitudinal) is 3 for a prior art shim, while it is about 1 for a shim according to this invention.

Further, in a shim according to the present invention lubricant may be used. In this case, since the grooves or recesses serve as a lubricant sink, capacity for maintaining lubricant is increased.

Moreover, in a case where the present invention is applied to a shim construction using lubricant and a metal (SUS) plate on a back surface of the RCM, it is not necessary to form any slit in the RCM and the effect of the lubricant and the effect of the grooves in the rubber layers complement each other to be exhibited satisfactorily. In this case, lubricant exists between one of the rubber layers in the RCM and the backplate or the metal plate disposed on the back surface.

Figure 3:
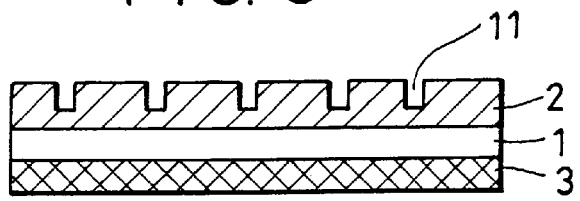
FIG. 3 is a cross-sectional view of a squeak preventing shim for a disk brake pad showing another embodiment of the present invention.

FIG. 3 shows another embodiment of the shim construction according to the present invention, in which a rubber layer 2 is disposed on only one surface of the metal plate 1 and an adhesive layer 3 is placed directly on the other surface of the metal plate 1, where there is disposed no rubber layer. A plurality of grooves 11 (or recesses) are formed in the rubber layer 2.

Figure 4:
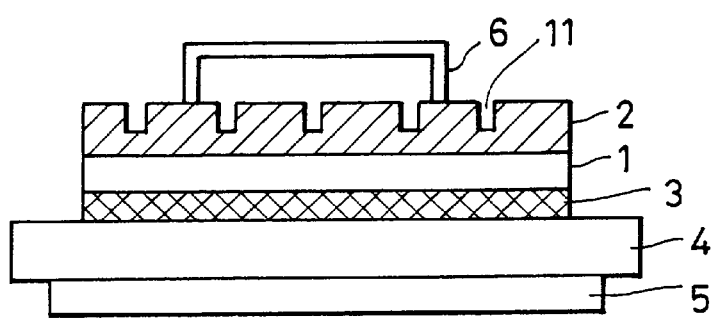
FIG. 4 is a cross-sectional view of a state, in which a shim construction indicated in FIG. 3 is mounted on a disk brake pad.

FIG. 4 shows a state, in which the shim construction indicated in FIG. 3 is stuck to a backplate 4 of a disk pad. According to the composition of this shim construction, not only is it possible to obtain the squeak preventing effect owing to the grooves described above, but also elution of matter precipitated from the rubber layer, which has lowered strength of the interface of the adhesive layer in a prior art shim, does not take place, because the adhesive layer is stuck directly to the metal plate, and therefore the adhesive layer does not peel off from the RCM so that the vibration damping effect is maintained.

Whether the grooves are formed in the rubber layers on both the surfaces of the metal plate or in which rubber layer on one of the surfaces thereof is decided, depending on the construction of the brake system and the mode of vibration damping for preventing squeak.

In a case where each of the rubber layers is 0.1 mm thick, the grooves are about 0.01 to 0.10 (mm) deep and the pitch there is about 0.01 to 50.00 (mm). For example, a plurality of semispherical recesses having a depth of 0.05 mm are formed in a surface portion of the rubber layer with a pitch of 0.45 mm.

Further, in a case where lubricant is applied on the rubber layers, in which the grooves are formed, disposed on the upper and lower surfaces of the metal plate, apart from the lubricant maintaining function of the lower surface, variations in the vibration transmission can be expected owing to the fact that boundary conditions at the contacting portion of the caliper brake (piston) with the upper surface are changed and therefore the squeak preventing effect increases further.

Figure 9:
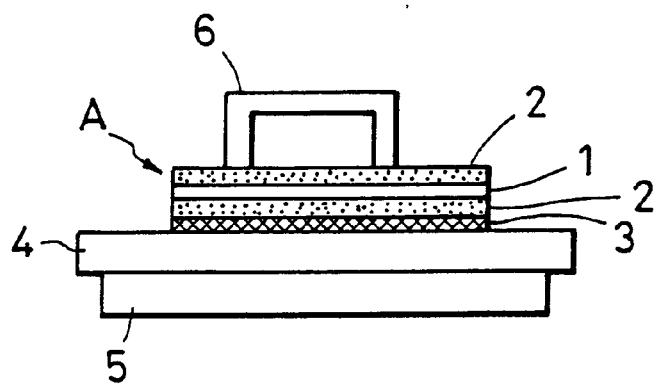
FIG. 9 is a cross-sectional view showing still another example of prior art squeak preventing shims.
Figure 10:
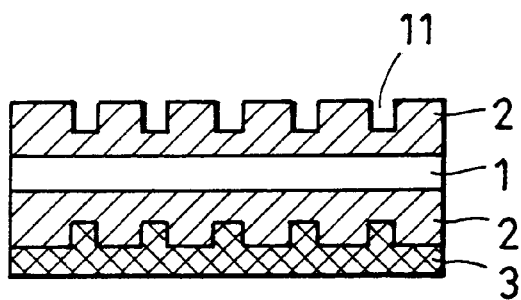
FIG. 10 is a cross-sectional view of a squeak preventing shim for a disk brake, which is still another embodiment of the present invention.

FIG. 10 shows still another embodiment of the present invention. The grooves 11 (or recesses) are formed in one of the rubber layers of the RCM and the adhesive layer 3 is applied on the surface thereof, this surface serving as an sticking portion to the brake pad. In this way, since it is so constructed that the adhesive layer 3 cuts more deeply into the rubber layer than in the prior art shim indicated in FIG. 9, the shim according to the present invention is more efficient for preventing peeling of the adhesive layer from the RCM. In addition, flow of adhesive due to pressure by a caliper brake is also smaller than in a prior art shim.

Figure 5:
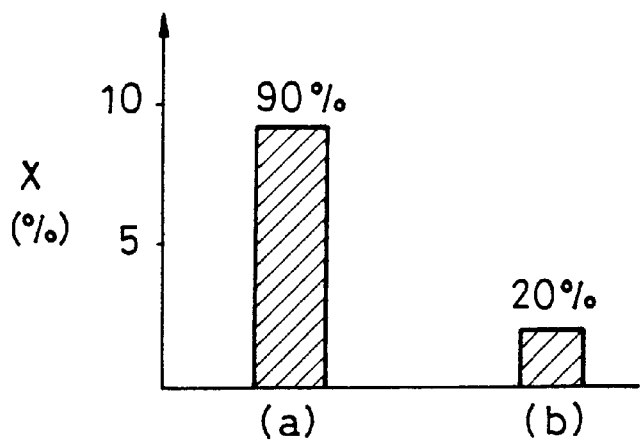
FIG. 5 is a graph showing an example of squeak production rate when a shim according to the present invention is used with respect to that obtained when a prior art shim is used.

FIG. 5 shows an example of rate X (%) of squeak production for a prior art shim (a) and a shim according to the present invention (b).

For realizing the present invention there are known following methods for forming the grooves or recesses in the rubber layers.

(i) a coating method is devised so that unevenness forming grooves (or recesses) are produced at coating of a metal plate with rubber;

(ii) a film-shaped sheet (e.g. cloth) having an arbitrary groove shape is stuck at the same time as coating with rubber and the sheet is peeled off after drying and vulcanization in order to transfer the groove shape;

(iii) dry rubber, which is not yet vulcanized, is put between embossed rolls having an arbitrary shape, etc. and vulcanized after press transfer;

(iv) usual rubber layers in an RCM are worked so as to form grooves having an arbitrary shape by a method such as cutting, etc.;

(v) usual rubber layers in an RCM are worked so as to form grooves mechanically at the same time as punching by means of a press.

As explained above, according to the present invention, apparent transversal elastic modulus of the rubber layers is lowered by forming a plurality of grooves or recesses in at least a rubber layer constituting a shim construction and in this way it is possible to efficiently prevent squeak due to vibration in a parallel direction to a shim, even if no lubricant is used. Further, in a case where lubricant is used, the grooves or recesses serve as a lubricant sink, and capacity for maintaining the shim, is increased.

What is claimed is:

1. A squeak preventing shim comprising:
 a shim construction including a metal plate and a rubber layer disposed on at least one surface of said metal plate,
 wherein a plurality of grooves or recesses are formed on a plane surface of said rubber layer, the plane surface comprising a first plane surface and said rubber layer including a second opposing plane surface in surface-to-surface relationship with said metal plate, the plurality of said grooves or recesses being entirely contained within said rubber layer.

2. A squeak preventing shim according to claim 1, wherein the plurality of said grooves or recesses lower the transversal elastic modulus of said rubber layer to prevent squeak due to vibration in a parallel direction to the shim.

3. A squeak preventing shim comprising:
 a shim construction including a metal plate and rubber layers disposed on both the surfaces of said metal plate,
 wherein a plurality of grooves or recesses are formed on a plane surface of one or both of said rubber layers, the plane surfaces of each rubber layer comprising respective first plane surfaces, each said rubber layer having a second opposing plane surface in surface-to-surface relationship with said metal plate, the plurality of said grooves or recesses being entirely contained within one or both of said rubber layers.

4. A squeak preventing shim according to claim 2, including lubricant between one of said rubber layers in said shim construction and a backplate of a brake pad.

5. A squeak preventing shim according to claim 4, wherein a second metal plate is placed on a back surface of one of said rubber layers in said shim construction and lubricant is present between said second metal plate and said one of said rubber layers.

6. A squeak preventing shim according to claim 2, wherein a second metal plate is placed on one of the first surfaces of one of said rubber layers in said shim construction and lubricant is present between said second metal plate and said one of said rubber layers.

7. A squeak preventing shim according to claim 2, wherein the plurality of said grooves or recesses lower the transversal elastic modulus of said rubber layers to prevent squeak due to vibration in a parallel direction to the shim.

8. A squeak preventing shim comprising:
 a shim construction including a metal plate, a rubber layer disposed on only one surface of said metal plate and an adhesive layer disposed on the other surface of said metal plate, where there is no rubber layer, said adhesive layer serving as a sticking portion for adhesion to a brake pad, wherein a plurality of grooves or recesses are formed on a plane surface of said rubber layer, the plane surface comprising a first plane surface and said rubber layer including a second opposing plane surface in surface-to-surface relationship with said metal plate, the plurality of said grooves or recesses being entirely contained within said rubber layer.

9. A squeak preventing shim according to claim 5, wherein the plurality of said grooves or recesses lower the transversal elastic modulus of said rubber layer to prevent squeak due to vibration in a parallel direction to the shim.

10. A squeak preventing shim according to claim 8, wherein the shim construction is free from the presence of lubricant.

11. A squeak preventing shim comprising:
 a shim construction including a metal plate, rubber layers disposed on both surfaces of said metal plate and an adhesive layer disposed on a surface of one of said rubber layers, said adhesive layer serving as a sticking portion for adhesion to a brake pad, wherein a plurality of grooves or recesses are formed on a plane surface of said rubber layers, the plane surfaces of each said rubber layer comprising respective first plane surfaces, each said rubber layer having a second opposing plane surface in contact with respective surfaces of said metal plate, the plurality of said grooves or recesses being entirely contained within said rubber layers.

12. A squeak preventing shim according to claim 11, wherein the plurality of said grooves or recesses lower the transversal elastic modulus of said rubber layers to prevent squeak due to vibration in a parallel direction to the shim.

13. A squeak preventing shim according to claim 11, wherein the shim construction is free from the presence of lubricant.

14. A squeak preventing shim according to claim 11, wherein portions of said adhesive layer are disposed in the plurality of said grooves or recesses on the surface of the one of said rubber layers contacting the adhesive layer.

15. A squeak preventing shim comprising:
 a shim construction including a metal plate and a rubber layer disposed on at least one surface of said metal plate,
 wherein a plurality of grooves or recesses are formed on a plane surface of said rubber layer, the plurality of said grooves or recesses comprising semispherical recesses entirely contained within said rubber layer.

16. A squeak preventing shim comprising:
 a shim construction including a metal plate and a rubber layer disposed on at least one surface of said metal plate,
 wherein a plurality of grooves are formed on a plane surface of said rubber layer, the plurality of said grooves being entirely contained within said rubber layer.

* * * * *